United States Patent Office 3,654,253
Patented Apr. 4, 1972

3,654,253
CONTINUOUS PRODUCTION OF ETHYLENE HOMOPOLYMERS
Klaus Steigerwald, 29 Ottweilerstrasse; and Oskar Buechner, 23 an der Froschlache, both of 6700 Ludwigshafen, Germany; Wolfgang Ball, O 6, 9, 6800 Mannheim, Germany; and Helmut Pfannmueller, 9 Donnersbergstrasse; and Friedrich Urban, 29 Schillerstrasse, both of 6703 Limburgerhof, Germany
No Drawing. Filed Oct. 31, 1969, Ser. No. 873,136
Claims priority, application Germany, Nov. 7, 1968,
P 18 07 493.6
Int. Cl. C08f 3/04, 1/60, 1/80
U.S. Cl. 260—94.9 R    7 Claims

ABSTRACT OF THE DISCLOSURE

Production of ethylene homopolymers at elevated temperature under superatmospheric pressure in a tube reactor having two successive reaction zones, a mixture of ethylene, polymerization initiator and polymerization modifier being introduced continuously at the beginning of each reaction zone. At the beginning of the first reaction zone a mixture of ethylene, an organic hydroperoxide having a half value temperature in the range from 200° to 260° C. and a polymerization modifier having a $C_s$ value of from $2.0 \times 10^{-2}$ to $1.0 \times 10^{-4}$ is introduced and at the beginning of the second reaction zone a mixture of an organic peroxide having a half value temperature in the range from 150° to 195° C. and a polymerization modifier having a $C_s$ value of from $2.0 \times 10^{-2}$ to $1.0 \times 10^{-4}$ is introduced. The half value temperatures of the two organic peroxides are at least 20° C. apart. The products have a wide molecular weight distribution and are practically devoid of very high molecular weight constituents.

---

The present invention relates to a process for the continuous production of ethylene homopolymers by polymerization of ethylene under the action of organic peroxides as free-radical-generating polymerization initiators and of polymerization modifiers at reaction temperatures of from 280° to 340° C. and pressures of from 1500 to 4000 atmospheres in a tube reactor which has two successive reaction zones of about equal length, a mixture of ethylene, polymerization initiator and polymerization regulator being introduced at the beginning of both reaction zones.

The following is typical of the prior art methods of this type (cf. for example French patent specifications Nos. 1,202,623 and 904,000 and the published papers of Belgian Pat. No. 943,980): a mixture of ethylene, a polymerization initiator having a relatively low half value temperature and a polymerisation modifier is introduced into the first reaction zone and the reaction temperature in this zone is kept relatively low. A mixture of ethylene, a polymerization initiator having a relatively high half value temperature and a polymerization modifier is introduced into the second reaction zone in which the reaction temperature is kept relatively high. In this way it is possible to obtain products having a wide molecular weight distribution. This is desirable for example in ethylene homopolymers which are to be processed into laminating films or sheeting because a wide molecular weight distribution is accompanied, inter alia, by a low "neck-in" (formation of a bulge at the edges of the sheeting, while it is still capable of plastic flow, after extrusion from a sheeting die). The products have not only a wide molecular weight distribution but also a fairly large proportion of very high molecular weight constituents. The latter may be a great disadvantage, for example in the case of ethylene homopolymers which are to be used in the field of laminating film. Among the effects of the very high molecular weight constituents is the fact that the molten polymer has a poor "draw-down," i.e. in the extrusion of film there is an increasing tendency for flaws (specks, holes) to form as the thickness of the film decreases.

The present invention has for its object to provide a process of the type defined above with which it is possible to prepare ethylene homopolymers which not only have a wide molecular weight distribution but also are practically devoid of very high molecular weight constituents.

We have found that the said object is achieved by using in the first reaction zone specific temperature conditions, polymerization initiators having a specific relatively high half value temperature and a polymerization modifier having a specific relatively low $C_s$ value and in the second reaction zone specific temperature conditions, a polymerization initiator having a specific relatively low half value temperature and a polymerization modifier having a specific relatively low $C_s$ value.

The subject of the present invention is therefore a process for the continuous production of ethylene homopolymers by polymerization of ethylene under the action of an organic peroxide as a free-radical-generating polymerization initiator and of a polymerization modifier at a reaction temperature of from 280° to 340° C. and a pressure of from 1500 to 4000 atmospheres in a tubular reactor having two successive reaction zones of about equal length, a mixture of ethylene, polymerization initiator and polymerization modifier being introduced into the reactor at the beginning of each reaction zone.

In the process according to this invention:

(1) a mixture at a temperature of 170° to 220° C. and a pressure of 1500 to 4000 atmospheres and which contains (for each 100 parts of ethylene) a weight, equivalent to 1 to 5 mole-p.p.m. (with reference to the ethylene) of an organic hydroperoxide having a half value temperature in the range of from 200° to 260° C. and 1.2 to 1.7 parts by weight of a polymerization modifier having a $C_s$ value of $2.0 \times 10^{-2}$ to $1.0 \times 10^{-4}$ is introduced at the beginning of the first reaction zone and the reaction temperature in said zone is kept within the range from 310° to 340° C., (2) a mixture at a temperature of 160° to 190° C. and a pressure of 1500 to 4000 atmospheres and which contains (for each 100 parts by weight of ethylene) a weight, equivalent to 5 to 20 mole-p.p.m. (with reference to the ethylene) of an organic peroxide having a half value temperature in the range from 150° to 195° C. and 1.2 to 1.7 parts by weight of a polymerization modifier having a $C_s$ value of from $2.0 \times 10^{-2}$ to $1.0 \times^{-4}$ is introduced into the beginning of the second reaction zone and the reaction temperature in the second reaction zone is kept within the range from 280° to 300° C., with the proviso that the half value temperature of the organic peroxides introduced into the first and second reaction zones should be at least 20° C. apart and with the proviso that the weight ratio of the mixture introduced into the first and second reaction zones per unit of time will be from 1:2 to 2:1.

This process makes it possible to prepare ethylene homopolymers which not only have a broad molecular weight distribution but which are also practically devoid of very high molecular weight constituents.

Conventional tubular reactors are suitable for carrying out the process. The process may also be carried out in a conventional manner provided due regard is had to the particularities according to the invention defined above. Rather than give further details, reference may be made for example to British patent specification No. 934,444.

The organic peroxides to be used according to the invention are required to have specific half value temperatures. The half value temperature is the temperature at which half of the given amount of peroxide has been decomposed after one minute.

Specific examples of organic hydroperoxides having half value temperatures (Hvt) within the range from 200° to 260° C. are: p-menthane hydroperoxide (Hvt=216° C.), cumene hydroperoxide (Hvt=255° C.) and diisopropylbenzene monohydroperoxide (Hvt=221° C.).

2-hydroperoxy-2-(o-isopropylphenyl)-propane, 2-hydroperoxy-2-(m-isopropylphenyl)-propane, 2-hydroperoxy-2-(p-isopropylphenyl)-propane and binary or ternary mixtures of these peroxides have proved to be particularly suited to the purpose of the invention. The half value temperatures of these peroxides and mixtures of peroxides are 221±5° C.

Specific examples of organic peroxides having a (Hvt) in the range of from 150° to 195° C. are: ter-butyl peracetate (Hvt=154° C.), tert-butyl perbenzoate (Hvt =166° C.), ditert-butyl preoxide (Hvt=193° C.) and methyl ethyl ketone peroxide (Hvt=182° C.). Ditertbutyl peroxide has been found to be particularly well suited for the purpose. It may be advantageous to use the peroxides in the form of solutions in inert solvents in the conventional way.

The polymerization modifiers to be used according to the invention should have $C_s$ values of from $2.0 \times 10^{-2}$ to $1.0 \times 10^{-4}$ (cf. G. A. Mortimer, J. Polymer Sci., A/1,4, 881 (1966), for the conception and definition of $C_s$ value). Specific examples of suitable polymerization regulators are methane ($C_s$ value=$7 \times 10^{-4}$), propane ($C_s$ value=$3.1 \times 10^{-3}$) and cyclohexane ($C_s$ value=$7.7 \times 10^{-3}$). It has been found that propylene ($C_s$ value=$1.3 \times 10^{-2}$) and propane ($C_5$ value=$31 \times 10^{-3}$) are particularly well suited to the purposes of this invention.

Ethylene homopolymers obtainable according to the process are particularly suitable for the production of laminating film and for coating paper and fabrics.

The following example illustrates the invention.

EXAMPLE

A conventional tubular reactor which is jacketed for temperature control, which has two successive reaction zones of equal length and in which the ratio of internal diameter to length is 1:10,000 in the first zone and 1:9000 in the second zone, is used.

A mixture which is at a temperature of 180° C., which is under a pressure of 2200 atmospheres and which contains 3000 parts by weight of ethylene, 0.13 part by weight (equivalent to 3.2 mole-p.p.m. with reference to ethylene) of a mixture of isomers of 2-hydroperoxy-2-(isopropylphenyl)-propane (in the form of a 2% by weight solution in methyl acetate; half value temperature =221° C.) and 47 parts by weight of propylene (polymerization modifier; $C_s$ value=$1.3 \times 10^{-2}$) is introduced continuously per hour at the beginning of the first reaction zone. The reaction temperature is kept at 330° to 340° C. by (a) the heat of reaction liberated and (b) the jacket cooling.

A mixture which has a temperature of 180° C. which is under a pressure of 2200 atmospheres and which contains 3000 parts by weight of ethylene, 0.37 part by weight (equivalent to 12.5 mole-p.p.m. with reference to ethylene) of ditert-butyl peroxide (in the form of a 2% by weight solution in methyl acetate: half value temperature =193° C.) and 47 parts by weight of propylene (polymerization modifier; $C_s$ value=$1.3 \times 10^{-2}$) is introduced per hour continuously at the beginning of the second reaction zone. The reaction temperature is kept at from 290° to 300° C. The ethylene homopolymer obtained at the end of the second reaction zone and also the unreacted components of the reaction mixture are brought into a separator which is under a pressure of 250 atmospheres by periodically lowering the pressure of the reactor to 1600 atmospheres.

In this way 1300 parts by weight per hour of ethylene homopolymer is obtained (equivalent to a yield of 21.6%); it has a melt flow index of 5.6 g./10 minutes and a density of 0.919 g./ccm.; its neck-in is less than 7% and its draw-down is good.

We claim:

1. A process for the continuous production of ethylene homopolymers by polymerization of ethylene under the action of an organic peroxide as a free-radical-generating polymerization initiator and of a polymerization modifier at a reaction temperature of from 280° to 340° C. and a pressure of from 1500 to 4000 atmospheres in a tubular reactor having two successive reaction zones of about equal length, a mixture of ethylene, polymerization initiator and polymerization modifier being introduced into the reactor at the beginning of each reaction zone wherein (1) a mixture having a temperature of 170° to 220° C. and a pressure of 1500 to 4000 atmospheres and which contains (for each 100 parts of ethylene) a weight equivalent to 1 to 5 mole-p.p.m. (with reference to ethylene) of an organic hydroperoxide having a half value temperature in the range of from 200° to 260° C. and 1.2 to 1.7 part by weight of a polymerization modifier having a $C_s$ value of 2.0 $\times 10^{-2}$ to $1.0 \times 10^{-4}$ is introduced at the beginning of the first reaction zone and the reaction temperature in the first reaction zone is kept within the range from 310° to 340° C.;

(2) a mixture which has a temperature of 160° to 190° C., which has a pressure of 1500 to 4000 atmospheres and which contains (for each 100 parts by weight of ethylene) a weight equivalent to 5 to 20 mole-p.p.m. (with reference to the ethylene) of an organic peroxide having a half value temperature in the range from 150° to 195° C. and 1.2 to 1.7 part by weight of a polymerization modifier having a $C_s$ value of from $2.0 \times 10^{-2}$ to $1.0 \times 10^{-4}$ is introduced into the beginning of the second reaction zone and the reaction temperature in the second reaction zone is kept within the range from 280° to 300° C.;

with the proviso that the half value temperatures of the organic peroxides introduced into the first and second reaction zones shall differ by at least 20° C. and with the proviso that the weight ratio of the mixtures introduced into the first and second reaction zones per unit of time shall be from 1:2 to 2:1.

2. A process as claimed in claim 1 wherein
the organic hydroperoxide used in the first reaction zone is p-menthane hydroperoxide, cumene hydroperoxide or diisopropylbenzene monohydroperoxide.

3. A process as claimed in claim 1 wherein
the organic hydroperoxide used in the first reaction zone is 2-hydroperoxy-2-(o-isopropylphenyl)-propane, 2-hydroperoxy - 2-(m-isopropylphenyl)-propane, 2-hydroperoxy-2-(p-isopropylphenyl)-propane or a binary or ternary mixtures thereof.

4. A process as claimed in claim 1 wherein
the organic peroxide used in the second reaction zone is ditert-butyl peroxide.

5. A process as claimed in claim 1 wherein
the organic peroxide used in the second reaction zone is tert-butyl peracetate, tert-butyl perbenzoate or methyl ethyl ketone peroxide.

6. A process as claimed in claim 1 wherein the organic hydroperoxide used in the first reaction zone is p-methane hydroperoxide, cumene hydroperoxide, diisopropylbenzene monohydroperoxide, 2-hydroperoxy-2-(o-isopropylphenyl)-propane, 2-hydroperoxy-2-(m-isopropylphenyl)-propane, 2-hydroperoxy-2-(p-isopropylphenyl)-propane or a binary or ternary mixture of the three last-mentioned compounds, the organic peroxide used in the second reaction zone is ditert-butyl peroxide, tert-butyl peracetate, tert-butyl perbenzoate of methyl ethyl ketone peroxide, and the polymerization modifiers used in said first and second zones respectively are methane, propane, cyclohexane or propylene.

7. A process as claimed in claim 6 wherein said polymerization modifier is propylene or propane.

References Cited

UNITED STATES PATENTS

| 2,868,762 | 1/1959 | Oakes | 260—897 A |
| 3,293,233 | 12/1966 | Erchak, Jr. et al. | 260—94.9 |
| 3,334,081 | 8/1967 | Madgwick et al. | 260—94.9 |

OTHER REFERENCES

Renfrew, A. and Morgan, P.: Polythene, p. 66, Interscience Publishers Inc., New York (1960).

JOSEPH L. SCHOFER, Primary Examiner

A. HOLLER, Assistant Examiner